(No Model.)

T. P. HOPPER.
COTTON SEED PLANTER.

No. 266,154.  Patented Oct. 17, 1882.

WITNESSES:
Chas. Niota
C. Sedgwick

INVENTOR:
T. P. Hopper
BY Munn & Co
ATTORNEYS.

UNITED STATES PATENT OFFICE.

THOMAS P. HOPPER, OF SHERMAN, TEXAS.

COTTON-SEED PLANTER.

SPECIFICATION forming part of Letters Patent No. 266,154, dated October 17, 1882.

Application filed February 16, 1882. (No model.)

*To all whom it may concern:*

Be it known that I, THOMAS PINKNEY HOPPER, residing near Sherman, in the county of Grayson and State of Texas, have invented a new and useful Improvement in Cotton-Seed Planters, of which the following is a full, clear, and exact description.

Reference is to be had to the accompanying drawings, forming a part of this specification, in which similar letters of reference indicate corresponding parts in all the figures.

Figure 1:
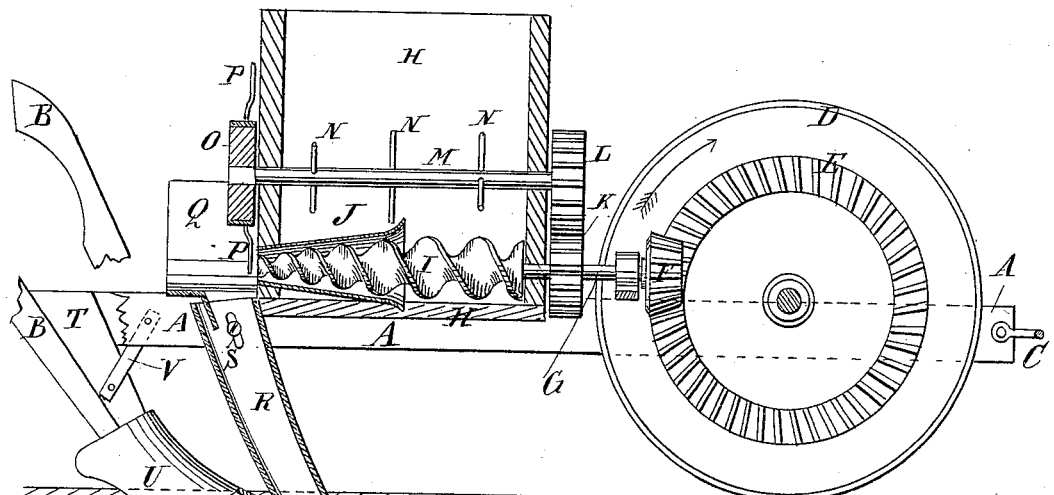
Figure 2:
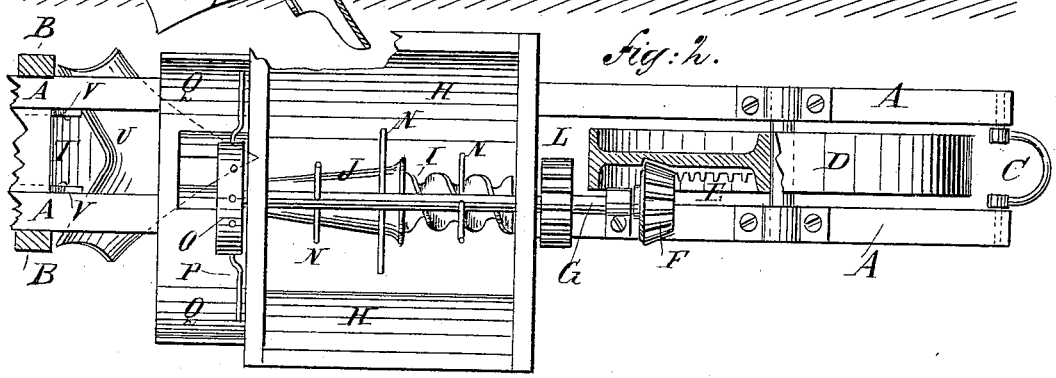
Figure 3:
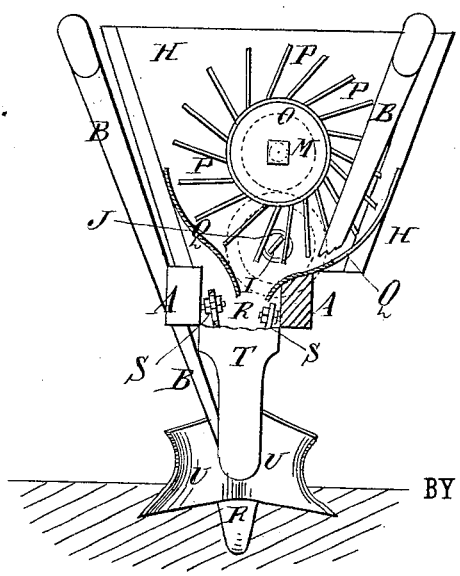

Figure 1 is a sectional side elevation of my improvement, parts being broken away. Fig. 2 is a plan view of the same, partly in section. Fig. 3 is a rear elevation of the same, partly in section.

The object of this invention is to promote accuracy and uniformity in the planting of cotton-seed and to secure the depositing of the seed in moist soil.

The invention consists in the combination, with the frame, the drive-wheel, and the hopper, of gear-wheels connected with the drive-wheel, a shaft, a feed-screw working in the hopper, and a tube inclosing the rear part of the screw, whereby the seeds will be fed out one at a time by the advance of the machine; also, in the combination, with the shaft, the hopper, and the feed-screw, of the gear-wheels connected with the feed-shaft, the stirrer-shaft, and the wheel having arms, whereby the seeds are pushed off separately as they are forced out by the feed-screw; and, also, in the combination, with the frame, the handles, and the hopper, of the adjustable tubular hoe, the standard, and the scraper, whereby the seed is deposited in the soil and the top of the ridge is cleared of clods and rounded off, as will be hereinafter fully described.

A represents the frame of the machine, to the rear part of which are attached the handles B, and to its forward end is attached the draft-clevis C.

In bearings attached to the forward part of the frame A is journaled the drive-wheel D, which is made with a wide rim, and to the side of which is attached, or upon it is formed, a large beveled-gear wheel, E.

Into the teeth of the large gear-wheel E mesh the teeth of a small beveled-gear wheel, F, attached to the forward end of the shaft G, which passes into and is swiveled to the forward end of the hopper H, attached to the frame A a little in the rear of the drive-wheel D.

To the shaft G, within the hopper H, is attached a screw, I, of such a length as to extend from the forward end of the hopper H to and through the rear end of the said hopper, so that its rear end will be flush with the outer surface of the rear end of the hopper H. The rear part of the screw I is tapered, and passes through and revolves in a tapered tube, J, the rear end of which is secured in the aperture in the rear end of the hopper H. The tube J is about half as long as the screw I, and its inner end is flared, so that the cotton-seed will enter it readily. The tapered spiral groove of the screw I is made of such a size that the cotton-seeds can readily pass into and be carried along the said groove within the tube J, so that a constant succession of seeds will be carried out by the said screw and dropped, one at a time, to the ground.

To the shaft G, at the forward end of the hopper H, is attached a gear-wheel, K, the teeth of which mesh into the teeth of the gear-wheel L, attached to the forward end of the shaft M. The shaft M revolves in bearings in the ends of the hopper H, and to the said shaft, within the said hopper, are attached radial arms N to keep the cotton-seed stirred up, so that it will be readily carried out by the screw I. The rear end of the shaft M projects at the rear end of the hopper H, and to the said end is attached a circular hub or wheel, O, to the rim of which are attached a series of arms, P. The arms P are inclined to the rearward, (see Fig. 3,) and are so bent that their outer parts will sweep along the outer surface of the rear end of the hopper H and push off the cotton-seeds as they are forced out, one by one, at the rear end of the tube J by the screw I, the inclination of the arms P preventing the said arms from carrying the seeds with them in their revolution and causing the seeds to drop freely.

To the lower part of the rear end of the hopper H is attached a curved apron, Q, to receive the seed, and which has an opening in its lowest part, through which the seed passes into the interior of the hoe R, so that the seed will enter the ground through the open lower end of the said hoe, and will thus be deposited in the damp soil, and will be covered with soil at the rear side of the hoe R as the said hoe moves forward through the soil. In the sides of the upper part of the hoe R are formed slots to receive the bolts S, that fasten the said hoe to the frame A, so that by loosening the said bolts the said hoe can be adjusted to work at any desired depth in the ground.

To the rear part of the frame A is attached the upper end of the standard T, to the lower end of which is attached a double-mold-board scraper, U. The point of the scraper U is inserted in a hole in the rear side of the lower part of the hoe R, so that the said scraper will always be kept in proper position. Several holes are formed in the rear side of the hoe R to receive the point of the scraper U, so that the said hoe can be adjusted to work deeper or shallower in the ground without changing the position of the scraper U. The draft-strain upon the scraper U is sustained by the brace-bars V, the lower ends of which are attached to the sides of the standard T, and their upper ends are attached to the frame A. The scraper U is further secured in place by the handles B, the lower ends of which are attached to the mold-boards of the said scraper. The lower edge or bottom of the scraper U is concaved, so that as the planter is drawn forward the scraper U will cut and push off the top of the ridge and push off any lumps or stones that might rest upon the top of the ridge over the seed, and thus obstruct the coming up of the plants, while the concaved bottom of the said scraper leaves the top of the ridge rounded up into proper shape.

Having thus fully described my invention, I claim as new and desire to secure by Letters Patent—

1. In a cotton-seed planter, the combination, with the frame A, the drive-wheel D, the gear-wheel E, and the hopper H, of the gear-wheel F, the shaft G, the tapering screw I, and the tapering tube J, having a flaring inner end, substantially as and for the purpose set forth.

2. In a cotton-seed planter, the combination, with the hopper H, the screw I, and the stirrer-shaft, of the wheel O, provided with radial arms P, and means for operating the said screw and wheel, substantially as and for the purpose set forth.

3. In a cotton-seed planter, the combination, with the hopper H, the shaft G, screw I, and the gear-wheel K, of the gear-wheel L, the stirrer-shaft M, and the wheel O, provided with radial arms P, substantially as and for the purpose set forth.

4. In a cotton-seed planter, the combination, with the frame A, the hopper H, the screw I, and the wheel O, provided with radial arms P, of the flanged apron Q and the adjustable hoe R, substantially as and for the purpose set forth.

5. In a cotton-seed planter, the combination, with the frame A, the hopper H, and the scraper U, of the adjustable hoe R, provided with a series of holes in its lower end to receive the point of the scraper, substantially as and for the purpose set forth.

THOMAS P. HOPPER.

Witnesses:
H. M. BENTON,
RUFUS SCOTT.